Figure 1:
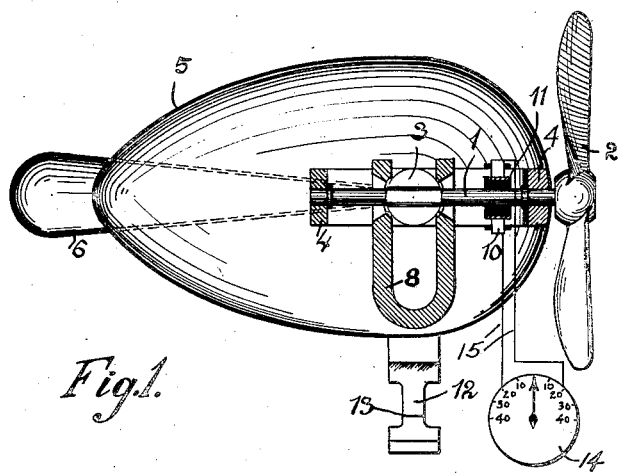

C. SCHOUTE, F. A. VAN HEYST AND N. E. G. MEYER.
APPARATUS FOR THE DETERMINATION OF VERTICAL VELOCITIES IN OR OF AIR OR WATER.
APPLICATION FILED MAR. 26, 1918.

1,345,556.    Patented July 6, 1920.

Inventors
C. Schoute.
F. A. van Heyst.
N. E. Groeneveld Meyer.
By H. R. Kerslake
  Atty.

UNITED STATES PATENT OFFICE.

CORNELIS SCHOUTE, OF DE BILT, NEAR UTRECHT, FLORIS ALBERT VAN HEYST, OF SOESTERBERG, AND NICOLAAS EVERHARD GROENEVELD MEYER, OF BOSCH EN DUIN, NEAR ZEIST, NETHERLANDS.

APPARATUS FOR THE DETERMINATION OF VERTICAL VELOCITIES IN OR OF AIR OR WATER.

1,345,556.　　　　　　Specification of Letters Patent.　　Patented July 6, 1920.

Application filed March 26, 1918. Serial No. 224,792.

*To all whom it may concern:*

Be it known that we, CORNELIS SCHOUTE, FLORIS ALBERT VAN HEYST, and NICOLAAS EVERHARD GROENEVELD MEYER, subjects of the Queen of the Netherlands, and residing at de Bilt, near Utrecht, the Netherlands, Soesterberg, the Netherlands, and Bosch en Duin, near Zeist, the Netherlands, respectively, have invented certain new and useful Improvements in Apparatus for the Determination of Vertical Velocities in or of Air or Water, of which the following is a specification.

This invention relates to an apparatus for the determination of vertical velocities in or of air or water.

For a proper navigation in the air as well as in water it is of vital importance to the navigator of the aerial craft or submarine to know at any moment the rate, at which his craft or vessel is climbing or falling. With the methods now in use this rate had to be derived from the indications of the barometer for measuring altitudes or depths respectively. Of course this method could only be applied successfully if carried out over some length of time and was even then comparatively little reliable.

The present invention relates to an apparatus by which the rate of climbing or falling of the machines referred to is indicated directly and continually by a suitable registering device. In accordance with the fundamental idea upon which the apparatus is based the vertical component of the velocity relative to the medium is determined, said component equaling the rate of climbing or falling relative to the earth, provided the movement of the medium relative to the surface of the earth be horizontal.

The invention will readily be understood by a reading of the following description of the embodiment illustrated in the accompanying drawing especially adapted for aerial crafts.

The embodiment comprises the following elements: a propeller, blade wheel or similar element, rotated through reaction when receiving a movement relative to the air, the rotary speed being proportional to the velocity of the relative movement within the velocity limits occurring in practice; further an electric generator armature driven from said reaction element and a magnet for exciting electric currents in said rotating armature.

The elements just specified, in combination constituting the apparatus according to the present invention, are arranged and constructed in a manner unusual in electro dynamic machines.

For instance, the generator armature and the magnet are adjustable to each other in such wise that with a horizontal relative movement the magnetic lines of force are parallel to the axis of rotation of the armature; with a relative movement inclined to the horizontal, on the other hand, said lines of force and said axis of rotation inclose an angle equaling the angle of incline of the relative movement.

Consequently the active part of the magnetic flux varies in proportion to the sine of said angle of incline. The number of revolutions of the armature being further proportional to the relative velocity of the air, the electromotive force excited in the armature evidently will be proportional to the product of both factors and may be used as a measure for the velocity in vertical sense relative to the medium, which will be practically identical to that relative to the earth.

Figure 2:
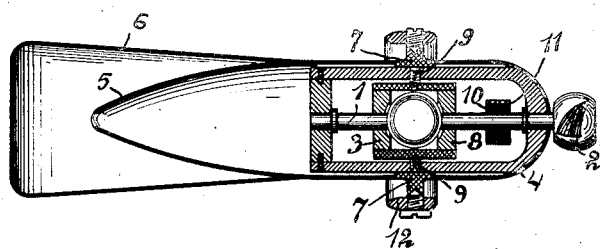
Figure 3:
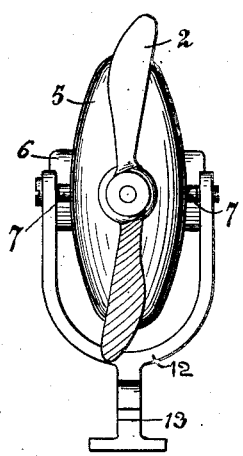

In the drawing Figure 1 represents a sectional side elevation and Fig. 2 a sectional plan view of the embodiment, while Fig. 3 illustrates the latter in front-elevation.

The shaft 1 carries the propeller 2 and the generator armature 3. Said shaft is rotating in fixed bearings 4 rigidly attached to the inclosed casing 5, while this casing itself is free to pivot under the influence of the tail plane 6 about the horizontal axis of the fulcrums 7.

The magnet 8 is pivotally suspended from the journals 9 and is governed by its gravity so as to maintain the magnetic flux, in which the ball-shaped armature 3 is embedded, horizontal. The arrangement being further such that with the shaft 1 of the generator armature occupying the horizontal position no electromotive force is induced in the windings 3ᵃ by rotation, while on the other hand any deviation of the shaft 1 from said horizontal position results in the excitation of an electromotive force proportional to the sine of the angle of inclination. Considering that said electromotive force is also proportional to the rotary speed of the armature or in other words to the relative velocity of the air and machine, it evidently is proportional to the product of both factors and, therefore, to the speed of the aerial craft in a vertical sense.

The electric current is taken from the armature over a collector or collector ring 11 and the brushgear 10. The frame carrying the whole has a member 12, connected to the foot 13, rigidly fixed to the craft of the engine. The connection between member 12 and foot 13 is such that the apparatus could easily rotate about a vertical axis (Figs. 1 and 3); this may be done by ending member 12 into a pivot, received by a hole in the foot 13, or in any other suitable manner.

A registering device 14 or any suitable current meter is electrically connected to the brushgear by conductors 15, the device indicating evidently the rise or fall of the aircraft.

It will be noted that it is not essential for the generator armature to be mounted on the propeller shaft direct, although this arrangement is preferred. Besides, the axis about which the magnet is pivotable need not coincide with the fulcrum about which the propeller is free to swing. Said propeller may with equal success be arranged at the rear of the device and may be so constructed as to allow its shaft to follow the direction of the relative movement of the machine and in that event the tail plane 6 especially adapted for normally causing the shaft to follow direction of the motion of the medium relative to the machine becomes superfluous. Eventually the direction of the magnetic lines of force may be secured in an other way than by gravity of the magnet.

Should it appear desirable to determine air or water currents other than horizontal the arrangement according to the present invention may conveniently serve for determining the vertical component of the velocity of the air.

Having now described our invention, what we claim as new and desire to secure by Letters Patent is:—

1. An apparatus for the determination of vertical velocities in or of air, water or other medium, comprising, in combination, a reaction element driven by said medium and adjustable to maintain a constant position with respect to the direction of the relative movement of said medium, an electric generator armature rotated by said reaction element and a field magnet in inductive relation to said armature, the angle between the direction of the lines of flux due to said field magnet and the axis of rotation of said generator armature being variable so as to correspond at any moment to the angle of the relative movement of said medium and the horizontal.

2. In an aerial craft or submarine an apparatus for the determination of climbing and falling or sinking speeds, comprising, in combination an indicator for registering rise and fall of the craft, a reaction element driven by the medium and adjustable to maintain a constant position with respect to the relative movement of said medium, an electric generator armature rotated and having its position controlled by said reaction element, means for producing a magnetic field the direction of the lines of force of which have a constant relation to the horizontal, and means for electrically connecting the indicator with the generator armature.

3. In an aerial craft or submarine an apparatus for the determination of climbing and falling or sinking speeds, comprising, in combination, an indicator for registering rise and fall of the craft, a reaction element driven by the medium, and adjustable to maintain a constant position with respect to the relative movement of said medium, an electric generator armature rotated and having its position controlled by said reaction element, a winding on said armature having its plane coinciding with the axis of rotation of said armature, a gravity controlled magnet having its flux coinciding with the direction of the axis of rotation of said armature and normally maintaining said flux in a constant relation to the horizontal, and means for electrically connecting the indicator with the generator armature.

4. In an aerial craft or submarine an apparatus for the determination of climbing and falling or sinking speeds, comprising, in combination, an indicator for registering rise and fall of the craft, a propeller, a shaft in said propeller, an electric generator armature on said shaft and rotated by said propeller, a carrying member for rotatably supporting said elements, a commutator associated with the carrying member for taking current from the armature, brush gear coacting with the commutator, fulcrums pivotally supporting said carrying member so as to allow said propeller to adjust said shaft in the direction of the relative movement, a magnet having its flux coinciding with the axis of rotation of said propeller, pivots for supporting said magnet above its center of gravity so as to cause said magnet to normally maintain a constant position with respect to the horizontal and electric conducting wires between the indicator and the brush gear.

In testimony whereof we affix our signatures in presence of two witnesses.

CORNELIS SCHOUTE.
FLORIS ALBERT van HEYST.
NICOLAAS EVERHARD GROENEVELD MEYER.

Witnesses:
 PLANTE FIBERE,
 B. PLARSNER.